[12] United States Patent  
Cadogan et al.

(10) Patent No.: US 10,982,812 B2  
(45) Date of Patent: Apr. 20, 2021

(54) COLLAPSIBLE CRYOGENIC STORAGE VESSEL

(71) Applicants: ILC DOVER IP, INC., Frederica, DE (US); AIR LIQUIDE ADVANCED TECHNOLOGIES U.S. LLC, Houston, TX (US)

(72) Inventors: David Phillip Cadogan, Middletown, DE (US); John Kun Hung Lin, Middletown, DE (US); Jonathan Michael Hinkle, Middletown, DE (US); Stephen Emerson Scarborough, Seaford, DE (US); Joanne M. Ware, Lewes, DE (US); Timothy Joseph Haggerty, Cheswick, PA (US); Chester Lloyd Benham, Newark, DE (US); Donald George Sticovy, Houston, TX (US); Craig Lasseter, Dewinton (CA)

(73) Assignees: ILC Dover IP, Inc., Frederica, DE (US); Air Liquide Advanced Technologies U.S. LLC, Houston, TX (US)

( * ) Notice: Subject to any disclaimer, the term of this patent is extended or adjusted under 35 U.S.C. 154(b) by 924 days.

(21) Appl. No.: 15/061,767

(22) Filed: Mar. 4, 2016

(65) Prior Publication Data

US 2017/0254481 A1 Sep. 7, 2017

(51) Int. Cl.  
*F17C 13/00* (2006.01)  
*F17C 3/08* (2006.01)  
*F17C 3/04* (2006.01)

(52) U.S. Cl.  
CPC .............. *F17C 13/001* (2013.01); *F17C 3/04* (2013.01); *F17C 3/08* (2013.01);  
(Continued)

(58) Field of Classification Search  
CPC .. F17C 13/001; F17C 3/04; F17C 3/08; F17C 2270/05; F17C 2270/02; F17C 2270/0171; F17C 2225/043; F17C 2223/046; F17C 2223/033; F17C 2223/0161; F17C 2221/033; F17C 2221/016; F17C 2221/014; F17C 2221/012; F17C 2221/011; F17C 2203/0685; F17C 2203/0658; F17C 2203/0624; F17C 2203/0607;  
(Continued)

(56) References Cited

U.S. PATENT DOCUMENTS 2,612,924 A * 10/1952 Cunningham ..... B65D 88/1637  
383/3  
2,724,418 A * 11/1955 Krupp ................... B64D 37/06  
220/565  
(Continued)

FOREIGN PATENT DOCUMENTS

EP 1282800 2/2003

*Primary Examiner* — Chun Hoi Cheung  
*Assistant Examiner* — Brijesh V. Patel  
(74) *Attorney, Agent, or Firm* — Christopher J. Cronin

(57) ABSTRACT

A design and construction method for a Collapsible Cryogenic Storage Vessel can be used for storing cryogenic liquids. The vessel provides the ability to be packed for transport in a compact state and erected at the point of use. The vessel can be used multiple times. The vessel's volume can also be adjusted during use to minimize or eliminate head space in the vessel.

12 Claims, 7 Drawing Sheets

(52) U.S. Cl.
CPC ............... F17C 2201/0104 (2013.01); F17C 2201/018 (2013.01); F17C 2201/0123 (2013.01); F17C 2201/0147 (2013.01); F17C 2201/0166 (2013.01); F17C 2201/03 (2013.01); F17C 2201/035 (2013.01); F17C 2201/037 (2013.01); F17C 2201/054 (2013.01); F17C 2203/013 (2013.01); F17C 2203/0304 (2013.01); F17C 2203/0604 (2013.01); F17C 2203/0607 (2013.01); F17C 2203/0624 (2013.01); F17C 2203/0658 (2013.01); F17C 2203/0663 (2013.01); F17C 2203/0685 (2013.01); F17C 2205/013 (2013.01); F17C 2205/0103 (2013.01); F17C 2205/0107 (2013.01); F17C 2205/0126 (2013.01); F17C 2205/0157 (2013.01); F17C 2221/011 (2013.01); F17C 2221/012 (2013.01); F17C 2221/014 (2013.01); F17C 2221/016 (2013.01); F17C 2221/033 (2013.01); F17C 2223/0161 (2013.01); F17C 2223/033 (2013.01); F17C 2223/046 (2013.01); F17C 2225/043 (2013.01); F17C 2270/01 (2013.01); F17C 2270/0171 (2013.01); F17C 2270/02 (2013.01); F17C 2270/05 (2013.01); Y02E 60/32 (2013.01)

(58) Field of Classification Search
CPC ...... F17C 2203/0604; F17C 2203/0304; F17C 2205/0157; F17C 2205/0126; F17C 2205/0107; F17C 2201/0104; Y02E 60/321
USPC .................. 220/560.1–560.13, 900–901, 220/560.04–560.08, 560.15, 592.26, 220/560.02, 560.09, 592.2, 592.24, 62.17, 220/723; 62/45.1, 50.1, 47.1, 48.1
See application file for complete search history.

(56) References Cited

U.S. PATENT DOCUMENTS

| | | | | |
|---|---|---|---|---|
| 2,751,953 A * | 6/1956 | Grimm | .................... | F16L 59/08 383/3 |
| 3,272,373 A | 10/1963 | Alleaume et al. | | |
| 3,169,379 A * | 2/1965 | Black | .................... | F17C 13/001 62/47.1 |
| 3,319,430 A | 5/1967 | Smell | | |
| 3,379,330 A | 4/1968 | Perkins, Jr. | | |
| 3,400,849 A * | 9/1968 | Pottier | .................... | F17C 3/04 220/560.08 |
| 3,510,142 A * | 5/1970 | Erke | .................... | B60P 3/426 280/837 |
| 3,669,816 A * | 6/1972 | Smith | .................... | B32B 15/20 428/61 |
| 3,919,855 A | 11/1975 | Turner | | |
| 4,023,617 A * | 5/1977 | Carlson | .................... | B65D 90/06 220/560.15 |
| 4,101,045 A | 7/1978 | Roberts et al. | | |
| 4,105,819 A * | 8/1978 | Kotcharian | .................... | B32B 15/08 220/901 |
| 4,154,363 A * | 5/1979 | Barthel | .................... | B32B 5/26 220/560.12 |
| 4,366,917 A | 1/1983 | Kotcharian | | |
| 4,394,929 A * | 7/1983 | Patel | .................... | F17C 13/005 220/560.12 |
| 4,875,596 A * | 10/1989 | Lohse | .................... | B65D 90/046 220/1.6 |
| 5,338,383 A | 8/1994 | Polackowyj | | |
| 5,419,139 A * | 5/1995 | Blum | .................... | B32B 7/02 220/62.17 |
| 5,499,743 A * | 3/1996 | Blumenkron | .................... | B65D 88/1656 220/4.13 |
| 5,524,781 A * | 6/1996 | Podd | .................... | B65D 90/046 220/1.5 |
| 5,555,997 A * | 9/1996 | Nogles | .................... | F24H 1/183 122/19.2 |
| 5,659,933 A * | 8/1997 | McWilliams | .................... | A61G 17/007 27/28 |
| 5,824,995 A * | 10/1998 | Wise | .................... | B60P 3/426 219/393 |
| 6,186,713 B1 * | 2/2001 | Bonerb | .................... | B60P 3/426 141/314 |
| 6,521,077 B1 * | 2/2003 | McGivern | .................... | F16L 59/08 220/560.12 |
| 6,626,312 B2 * | 9/2003 | Maturana | .................... | B65D 90/046 220/1.6 |
| 6,708,502 B1 | 3/2004 | Aceves et al. | | |
| 6,742,554 B1 * | 6/2004 | Immel | .................... | F17C 1/00 220/560.05 |
| 6,860,218 B2 * | 3/2005 | Eagles | .................... | B63B 35/285 114/256 |
| 7,165,698 B2 | 1/2007 | Immel et al. | | |
| 7,169,452 B1 * | 1/2007 | Monk | .................... | B60K 15/03177 220/560.02 |
| 7,213,970 B1 * | 5/2007 | Reicin | .................... | B65D 88/16 383/105 |
| 7,494,023 B2 * | 2/2009 | Rohwer | .................... | F17C 3/04 220/560.12 |
| 7,717,296 B1 * | 5/2010 | Guthrie | .................... | B65D 88/22 222/105 |
| 8,690,000 B2 | 4/2014 | Lacapere et al. | | |
| 8,807,382 B1 * | 8/2014 | Haberbusch | .................... | F17C 13/001 220/560.04 |
| 8,899,835 B2 * | 12/2014 | Russell | .................... | B65D 90/046 383/119 |
| 8,960,482 B2 | 2/2015 | Brooks et al. | | |
| 2004/0234175 A1 * | 11/2004 | Takita | .................... | B65D 33/02 383/88 |
| 2005/0220369 A1 * | 10/2005 | Sullivan, Jr. | ......... | B65D 75/563 383/22 |
| 2006/0086741 A1 | 4/2006 | Bacon et al. | | |
| 2008/0256960 A1 | 10/2008 | Greason et al. | | |
| 2009/0199574 A1 * | 8/2009 | Hirose | .................... | C01B 3/0005 220/560.04 |
| 2009/0283176 A1 | 11/2009 | Berry et al. | | |
| 2009/0304308 A1 * | 12/2009 | Townsend | .................... | B65D 88/1662 383/24 |
| 2010/0012787 A1 | 1/2010 | Hand | | |
| 2010/0187237 A1 | 7/2010 | Brooks et al. | | |
| 2010/0316310 A1 * | 12/2010 | Heater | .................... | B65D 88/1606 383/119 |
| 2013/0142456 A1 * | 6/2013 | Joshi | .................... | B65D 90/08 383/95 |
| 2014/0117021 A1 | 5/2014 | Quemerais et al. | | |
| 2014/0133951 A1 * | 5/2014 | Thomas | .................... | B65D 88/1606 414/800 |
| 2015/0048083 A1 * | 2/2015 | Kral | .................... | B65D 88/16 220/4.13 |

* cited by examiner

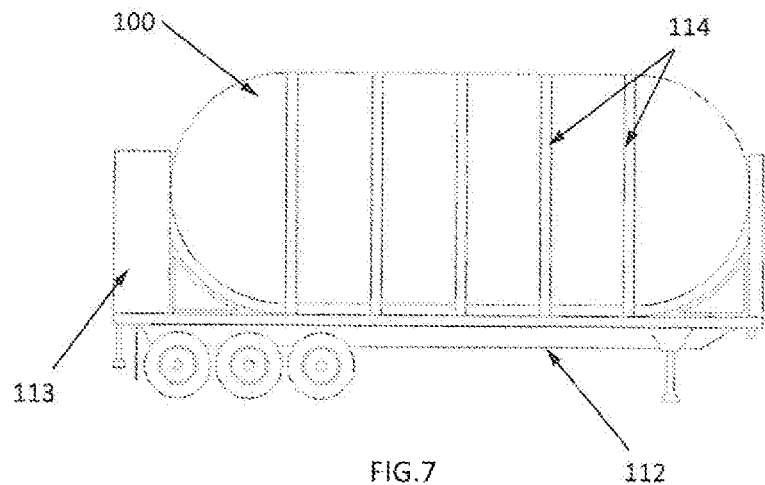
FIG. 7
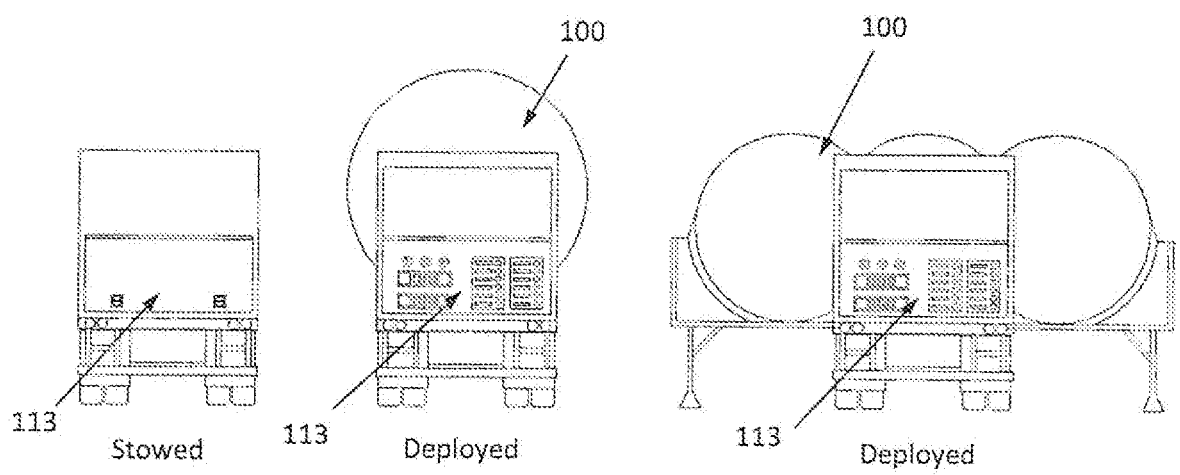
Fig. 8A  Stowed
Fig. 8B  Deployed
Fig. 8C  Deployed

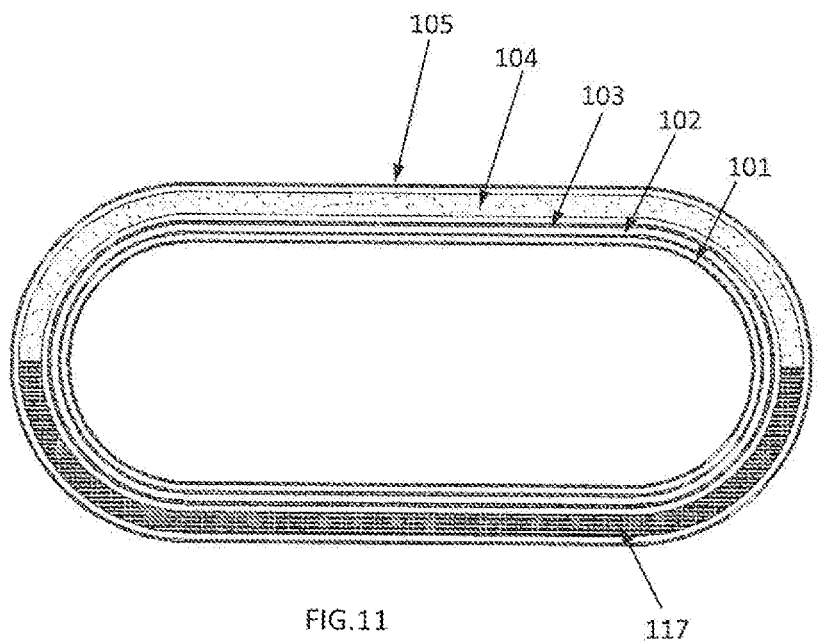
FIG.11
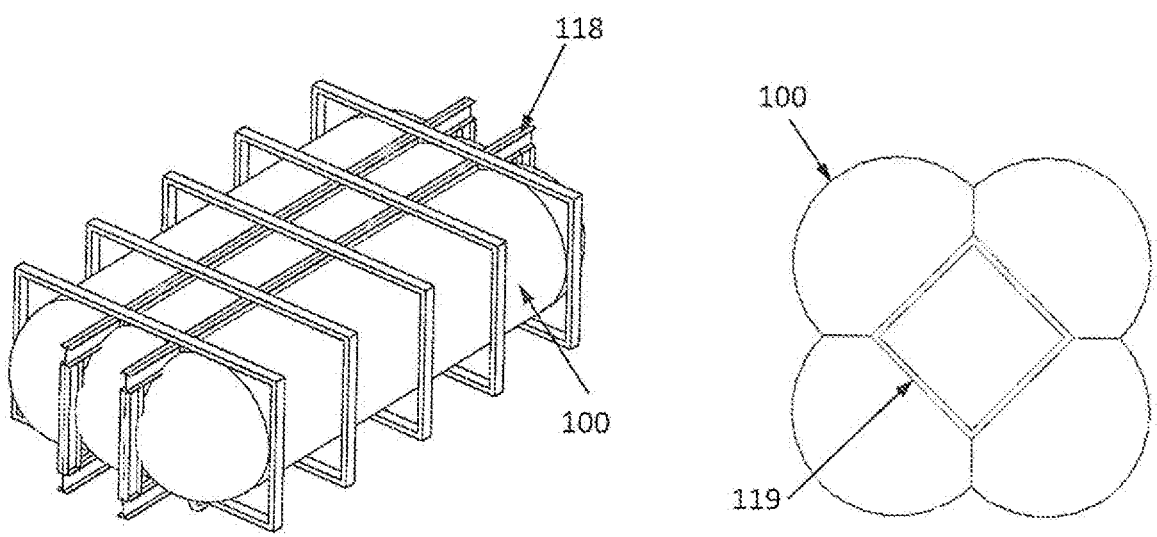
FIG.12
FIG.13

COLLAPSIBLE CRYOGENIC STORAGE VESSEL

FIELD OF THE INVENTION

The present invention relates to collapsible pressure vessels manufactured from flexible materials used for fluid or gas storage applications. More particularly, the present invention relates to collapsible pressure vessels for holding cryogenic fluids. Vessels of this type can be used for storing and transporting cryogens of all kinds, and can be used in any environment including water, air, or in the vacuum of space. In addition to collapsibility for transport, the flexibility of the materials comprising the vessel affords the vessel the ability to have its internal volume modified during use.

BACKGROUND OF THE INVENTION

There are numerous processes in a variety of industries that require cryogenic fluids for operation. Applications are very diverse and include uses such as food processing, hydraulic fracturing in oil and gas production, chemical production and processing, medical experimentation, and space exploration. A variety of cryogenic liquids are used in these applications including liquid nitrogen, liquid oxygen, liquid argon, liquid hydrogen and liquid natural gas to name a few. Cryogenic fluid storage vessels have historically been manufactured from rigid materials including various metals and rigid composite materials. Rigid vessels have limitations in transport and area required for storage. Rigid vessels are also susceptible to stress and thermal expansion issues resulting from repeated excursions to cryogenic temperatures, and settling of insulation if exposed to vibration which leaves insulation gaps in the vessel.

Examples of rigid vessels can be seen in everyday life as cryogenic storage container trucks move cryogens on roadways all over the world. These trucks are limited in size and weight by transportation regulatory agencies. In some cases, such as hydraulic fracturing, large volume temporary storage containers are required to facilitate the operation. In a case such as this, the largest possible empty vessels called Kings or Queens are moved to the site and filled by smaller container trucks. The use of the larger vessels has a significant positive economic and functional impact on operations, including the number of trucks/drivers required, ground area consumed, and amount of pumping equipment required. Transportable, collapsible vessels offer operational and economic benefits in cases such as this because they can multiply the savings potential by facilitating the transport of even larger tanks than kings.

Smaller cryogenic storage vessels called dewars are ubiquitous in industry. These vessels are moved in and out of facilities all over the world every day. They are limited in volume to facilitate mobility so industrial applications often require numerous dewars. Therefore, it can be seen that some industries, especially those that value mobility, would benefit from mid-size transportable vessels.

Many industries purchase or rent large cryogenic storage vessels to support operations. These are typically large steel vessels that are mounted to concrete pads. This requires infrastructure planning, modification, and maintenance. Transportable vessels will offer the potential to support industrial operations without costly facilities modifications.

Oil and gas production companies regularly transport cryogenic Liquefied Natural Gas (LNG) on ships over waterways, on rail cars over railways, or on trucks over roads. Much of the tanks used in this supply chain are transported empty and are therefore an economic drain. This process also has a negative impact on the environment. Collapsible vessels can be packed and shipped collectively to greatly reduce the economic burden of rigid tanks.

Rigid vessels can be made mobile by mounting them on transportation systems such as trucks, rail cars, ships, or carts. Collapsible vessels can also be mounted to transportation platforms of all kinds to facilitate long distance or local mobility.

SUMMARY OF THE INVENTION

This invention pertains to a collapsible cryogenic storage vessel that is transportable in a packed condition and can be used in a variety of applications. The vessel functions when exposed to cryogenic temperatures and withstands hydrostatic and pressurization stresses as the cryogens evolve into gas over time. The wall of the inflatable vessel is made from an assembly of multiple layers of flexible materials. This assembly of multiple layers of flexible materials are joined or seamed in a manner that allows for the vessel to take a shape of a horizontal cylinder with hemi-spherical ends when the vessel is filled with a cryogenic fluid or its resultant boil-off gas. The collapsible cryogenic storage vessel resembles and functions as a pressure vessel when it is filled with a cryogenic fluid.

The fundamental design of the collapsible cryogenic storage vessel allows for it to be made available for industrial applications in any size ranging from a small table top module to a large structure spanning hundreds of feet in length and tens of feet in diameter. The collapsible cryogenic storage vessel can be a simple shape such as a straight cylinder, or it can be manufactured with internal spars/septums to allow it to take a flattened shape. It can also be joined shapes such as intersecting cylinders that form "T", "L", "Y" or other more complex shapes. This approach facilitates use of these vessels in vehicles or equipment where the space for tankage is often limited and unusually shaped. The pressure intensifier can be a freestanding single volume or it can be attached to a transportation device such as a cart, truck, railcar, ship, or other platform for mobility.

The flexible wall of the chamber is made from an integrated assembly of various layers of softgoods materials. The wall of the collapsible cryogenic storage vessel comprises multiple flexible layers that are attached together to form a single assembly. The outermost layer of the assembly is a protective cover. This layer is a coated fabric which provides protection of the subsequent layers from impact, cut, flame, dirt, and other external threats. It also is sealed to form a gas tight envelope around the subsequent insulation layer to, prevent condensation in that layer. The insulation layer protects the cryogenic fluid in the vessel from warming and evolving into a gas. It is formed by layering insulation such as wool, aerogel, or glass fiber batting, or bags of lose material such as perlite, wool, or other insulation materials. The next layer is called the restraint and is made from webbings that are woven and or connected to one another to form a structural shell or net that can withstand the stresses induced by hydrostatic or pressurization loads. The webbings are woven to provide structural redundancy in the event of damage to individual webbings because the friction in the woven assembly prevents it from coming apart and load is redistributed in the assembly. High-strength fabrics, braided tubes, or cord nets can also be used to form the structural restraint. Numerous types of fibers can be used in the restraint assembly including but not limited to Kevlar, Vectran, Nylon, Polyester, and stainless steel. The layer under the restraint layer is a fabric that stabilizes the webbing restraint and prevents the pressurized bladder under it from bulging through any openings in the woven restraint layer which could induce stress in the bladder. The next layer of the wall, which is also the innermost layer of the assembly, is the bladder. It is made from a film, coated fabric, or laminate of, materials that is thermally welded or bonded together. This layer contains the cryogen, and is manufactured from materials that can withstand the temperatures associated with exposure to cryogens. The bladder or other layers can be fitted with integrated sensors of an externally applied type or an integral electronic textile type for structural health monitoring of any layer of the vessel. Additional layers can be added as required to improve functionality or safety. For instance, a secondary bladder layer can be added between the insulation and the restraint to contain any leakage that could occur with damage to the innermost bladder layer.

The layers discussed above are connected to one another, or indexed, such that they act in unison when packing or deploying the vessel. This is important because it eliminates the potential for misalignment of layers during deployment which could allow them to become stressed and fail in use. Indexing can be accomplished by a number of methods including local bonding, riveting, sewing, lacing, hook and loop, magnets, etc.

The flexible wail of the inflatable chamber can be fitted with any number of sealed pass-through systems to facilitate filling, draining, pressure control, and sensing. One way to do this is through the addition of rigid metal panels attached to the vessel such that all the layers function in an uninterrupted manner, and support the addition of ports.

The collapsible cryogenic storage vessel can be designed to have shapes other than spheres and round ended cylinders. Standard shapes can be intersected such as joining cylinders into "L" or "T" shaped vessels. Internal spars that are extensions of the structural restraint can be used to flatten vessels into approximated cuboid volumes. Other shapes such as conical sections are also possible. It is possible to use all of these tools in conjunction to create a vessel of most any shape. This may be necessary to fit into space available on a spacecraft, car, building, or other structure.

For very large sizes, or higher pressure applications of the collapsible cryogenic storage vessel, an interconnected frame work of metal beams is provided for external application. The skeletal framework of metal beams is useful in sharing the forces exerted on the wall of the pressure vessel and therefore allows the vessel to grow in size and shape beyond the practical limits of an unsupported inflatable structure. The framework is easily assembled or disassembled for transport. The softgoods wall of the vessel protrudes between the support beams such that it looks like a quilted mattress. This design reduces the skin stress of the lobed sections by reducing their local radius of curvature, which is the variable along with internal pressure that dictates skin stress. Lower skin stresses are desirable because they increase safety for the user, and allow the chamber to be used at higher pressures. The flexible material assembly of the chamber wall has a provision to be attached to the external metal frame to position it properly during use. The metal framework can be configured such that any tank shape can be made.

The collapsible cryogenic storage vessel can also be configured to include the rigid metal frame on the inside. If the rigid frame is in the inside of the vessel, it provides structural attachment points for the flexible vessel. Through patterning and location of the attachment points the vessel can be forced to take a lobed shape when filled with cryogen and therefore yield reduced skin stresses.

The collapsible cryogenic storage vessel will be attached to hoses, valves, pumps, pressure relief systems, sensors, and other components to facilitate filling and draining of the vessel. The vessel can be supported by a shaped holding cradle, discrete support blocks, or suspended from guy wires. The material used in the supports has good insulation properties and can either compress the insulation in the vessel where contact occurs or contact the restraint where insulation is locally removed from the vessel. Another option is for the supports to be inflatable to facilitate lifting of the vessel to facilitate draining.

BRIEF DESCRIPTION OF THE DRAWINGS

FIG. 7: Illustrates a side view of a vehicle mounted cylindrical collapsible cryogenic storage vessel;

FIG. 8A: Illustrates the rear view of vehicle mounted cylindrical collapsible cryogenic storage vessels in their stowed state;

FIG. 8B: Illustrates the rear view of vehicle mounted cylindrical collapsible cryogenic storage vessels in their deployed cylindrical configuration;

FIG. 8C: Illustrates the rear view of vehicle mounted cylindrical collapsible cryogenic storage vessels in their deployed lobed configuration;

FIG. 11: Illustrates the use of a rigid insulation basin to hold the vessel;

FIG. 12: Illustrates one variation of a standalone collapsible cryogenic storage vessel with an external rigid frame;

FIG. 13: Illustrates one variation of a standalone collapsible cryogenic storage vessel with an internal rigid frame;

DETAILED DESCRIPTION OF THE PREFERRED EMBODIMENTS

It should be understood by the reader, that throughout the description of the preferred embodiments like elements in different Figures use the same numerical indicators.

Figure 1:
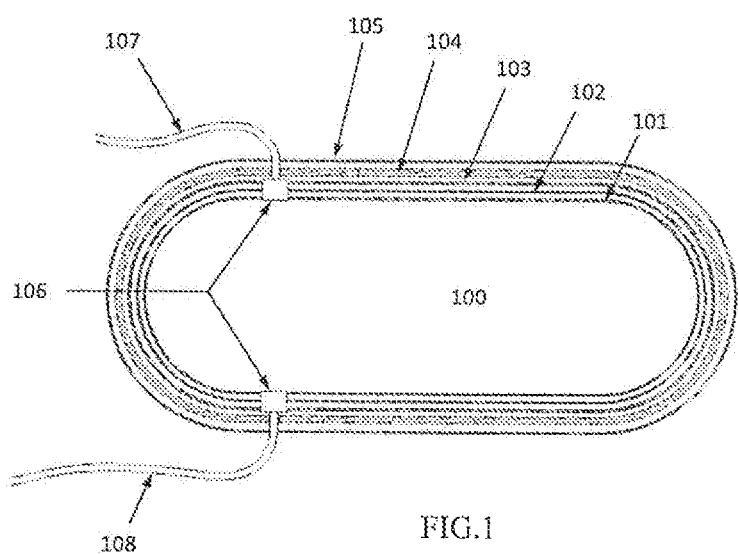
FIG. 1: Illustrates the cross-section of a standalone cylindrical collapsible cryogenic storage vessel.

FIG. 1 illustrates the cross-section of a standalone cylindrical collapsible cryogenic fluid storage vessel in its filled state 100. The flexible vessel has several layers including the membrane fluid containment layer (also known as bladder) 101, the protective liner 102, the structural layer (also known as restraint) 103, multiple insulation layers 104, and a protective outer cover 105. The vessel also has integral fill and drain fittings 106 which can be connected to flexible or rigid fill 107 and drain 108 lines. These fittings can be placed anywhere on the vessel.

Figures 2A, 2B:
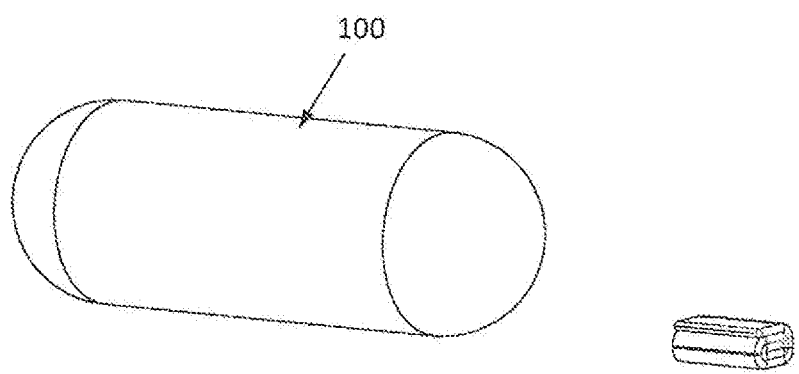
FIG. 2A: illustrates that the collapsible cryogenic storage vessel is considerably smaller in its packed state than its deployed state.
FIG. 2B: illustrates the collapsible cryogenic storage vessel of FIG. 2A in its deployed state.

Because the materials used in the construction of the vessel are flexible the vessel can be drained and folded or rolled into a smaller volume for convenient storage or transport. FIG. 2 illustrates the compressible nature of the evacuated tank 100 which allows the packed vessel to be many times smaller in volume than when in its filled state.

Figure 3:
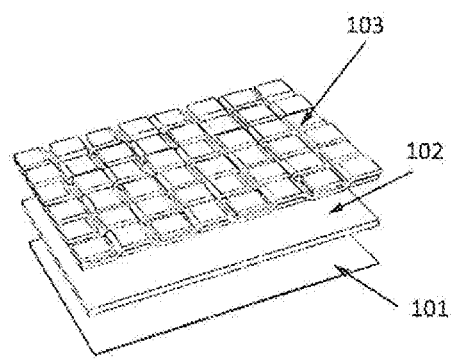
FIG. 3: illustrates the cross-section of the innermost layers of the vessel, including the woven textile structural layer.
Figure 4:
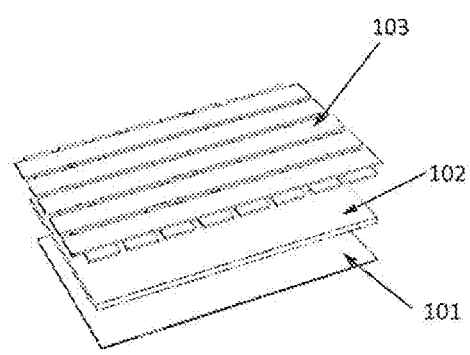
FIG. 4: Illustrates the cross-section of the innermost layers of the vessel, including the overlapped textile structural layer.

FIG. 3 illustrates the use of webbings or tapes which are three dimensionally woven to form the structural layer 103. This results in a damage tolerant design because of how friction locks the assembly together when the vessel is pressurized. FIG. 4 illustrates another method of manufacture of the structural layer would be to overlap the webbings 103 and connect them intermittently to make them form an assembly shaped as a vessel.

Figure 5:
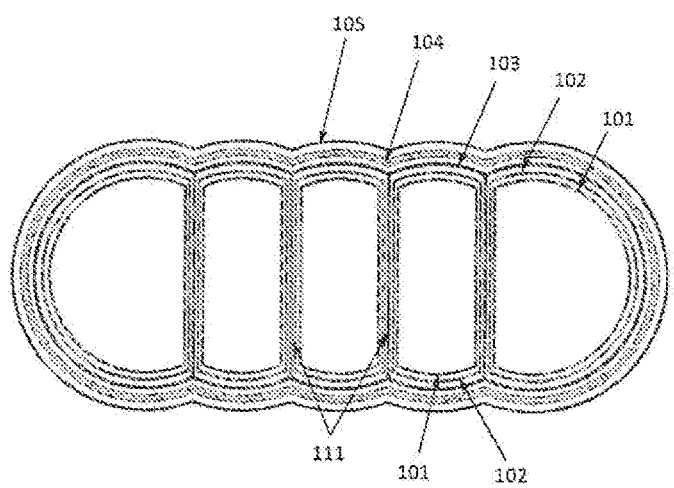
FIG. 5: illustrates the use of internal spars to alter the shape of the vessel from spherical or cylindrical.
Figure 6:
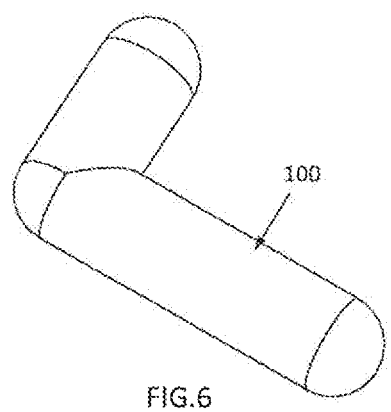
FIG. 6: Illustrates that the flexible vessels of any shape can be joined to create complex shapes.

In their simplest form flexible pressure vessels 100 generally take the shape of a sphere of a cylinder when pressurized. In some cases it may be desirable to alter the geometry of the pressure vessel to facilitate an operational constraint. In this case internal spars 111 can be attached from opposite or adjacent walls to draw them in closer proximity which alters the shape of the vessel as illustrated in FIG. 5. The spars 111 can be in any configuration including being attached to one another to form internal compartments or partitions in the vessel. Flexible pressure vessels 100 can also be joined to form complex shapes as shown in FIG. 6. By combining these approaches almost any vessel shape is possible.

The collapsible cryogenic fluid storage vessel 100 can be a standalone system or it can be mounted to a transportation system of any type. FIG. 7 illustrates a trailer mounted cylindrical vessel 100 held in place on the vehicle base 112 by straps 114. A container 113 which houses pumps, valves, control systems, and other equipment for filling and draining the pressure vessel can be mounted to the vehicle. This assemblage can take many forms depending on the shape of the vessel 100 and the vehicle system. FIGS. 8A, 8B and 8C illustrates the rear view of FIG. 7 for vehicle mounted cylindrical collapsible cryogenic storage vessels 100; in their stowed state; deployed cylindrical configuration; and in a deployed lobed configuration, respectively.

Figure 9:
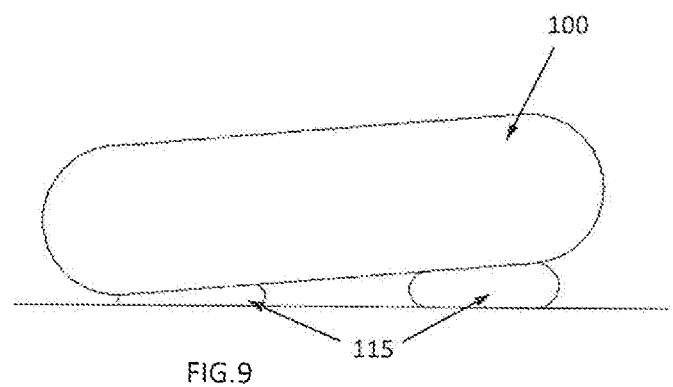
FIG. 9: Illustrates the use of pressurized chambers to lift and tilt the vessel.

FIG. 9 illustrates a method to elevating the vessel 100, or tilting it to aid in draining it or using it on uneven ground. Pressurized lifting chambers 115 can be mounted under or attached to the vessel 100. The orientation of the vessel 100 can be altered by adjusting the pressure in the lifting chambers 115.

Figure 10:
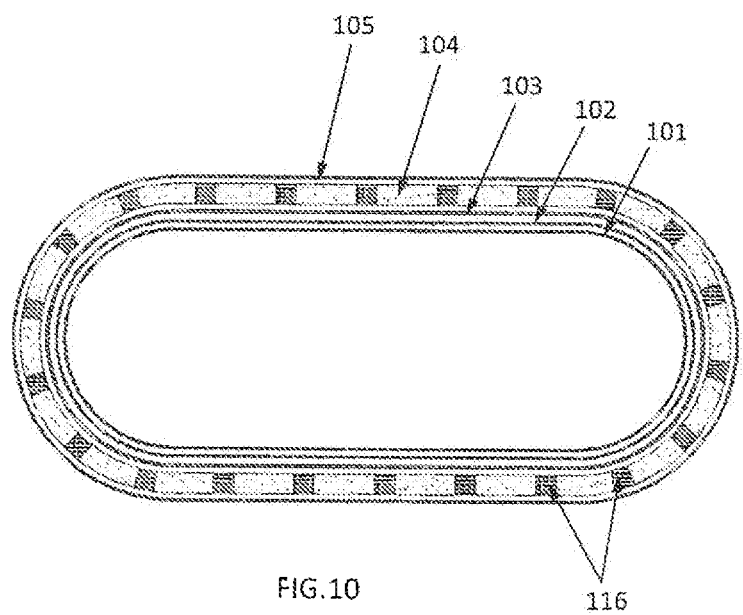
FIG. 10: Illustrates the addition of rigid insulation blocks to support the filled vessel or create supports in the insulation which allow vacuum to be applied to the insulation cavity, without compressing the flexible insulation.

The collapsible cryogenic fluid storage vessel 100 can rest on any surface. However, since the insulation 104 is flexible it can become compressed and lose efficiency. Rigid insulation blocks 116 can be added to the assembly locally in place of flexible insulation 104 to support the vessel and prevent compression of the insulation 104 as illustrated in FIG. 10. The rigid insulation blocks 116 can be shaped to prevent the vessel from rolling. They can also be contained inside the outer cover 105, protrude through the outer cover 105, or be outside the outer cover 105. The rigid insulation blocks 116 can also be placed intermittently over the entire vessel between the structural layer 103 and the protective outer cover 105, locally replacing flexible insulation. A vacuum can then be applied between the protective membrane outer cover 105 and the membrane fluid containment layer 101 to improve the insulation properties of the vessel. It is also possible that the rigid insulation 117 can be extended in size and shaped to resemble a cradle or tub for the vessel 100 to reside in as illustrated by FIG. 11. Both uses of rigid insulation blocks 116 and a rigid insulation cradle 117 facilitate collapse of the vessel 100 for shipping or storage.

As the operational pressure and the size of the collapsible cryogenic fluid storage vessel 100 increase the stress in the structural layer 103 increases. Eventually a point is reached where flexible materials cannot be used to construct a flexible structural layer 103. To remedy this, rigid beams 118 can be added to the exterior of the vessel 100 and undersized in comparison to the vessel such the vessel 100 becomes lobed as illustrated in FIG. 12. Since the stress in the walls of a flexible structure are dictated by the internal pressure and radius of curvature, the lower radius of curvature in the lobes will reduce stresses in the vessel to levels where flexible materials can be used to construct the structural layer 103. This approach is scalable in many ways to yield vessels 100 of various shapes and sizes. Conversely, the rigid beams 119 can also be placed inside the vessel 100 to perform the same shape control function as illustrated in FIG. 13. Again, this approach is scalable in many ways to yield vessels 100 of various shapes and sizes.

Figure 14:
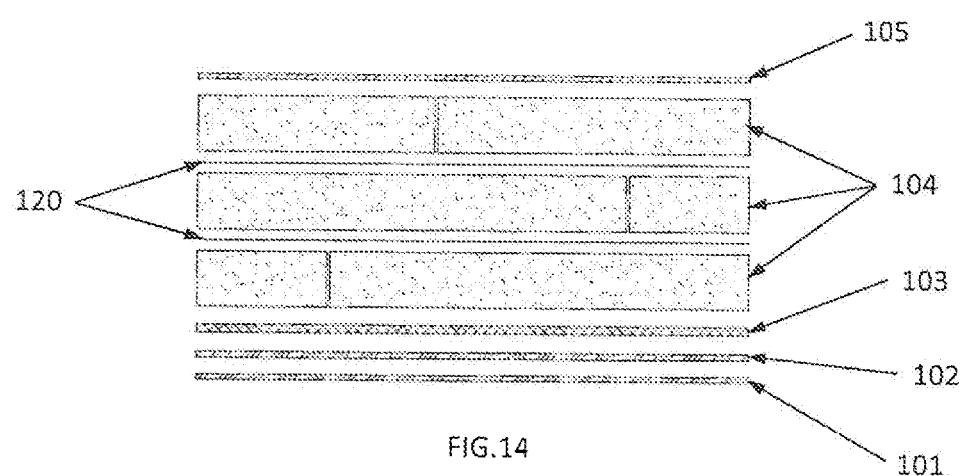
FIG. 14: Illustrates the misalignment of the seams in the insulation and the potential use of impermeable membranes between insulation layers.
Figure 15:
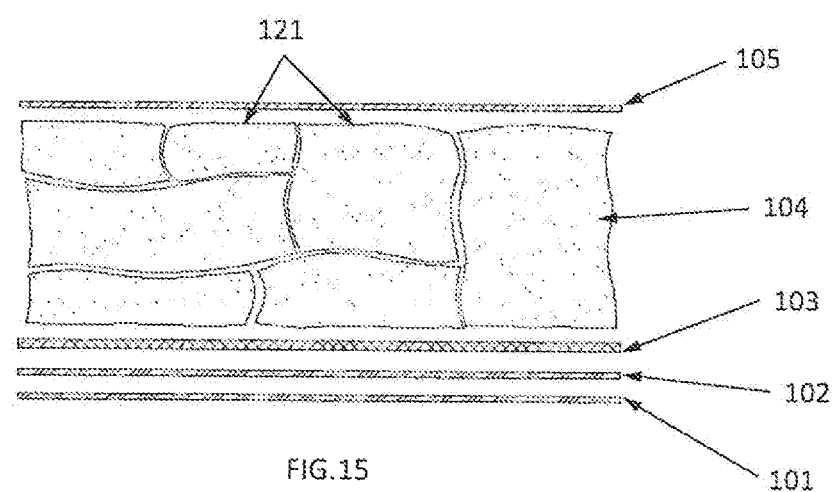
FIG. 15: Illustrates the use of flexible sealed bags to contain lose insulation material such that it can be arranged in various ways to create a unified insulation layer; and, FIG. 16: Illustrates the addition of a secondary membrane fluid containment layer for redundancy.

The collapsible cryogenic fluid storage vessel 100 will have varying amounts of, and types of, insulation 104 depending on how it is used. The insulation 104 is flexible and some forms come in layers. Preferably, the layers will be assembled such that the gaps in the individual flexible insulation layers 104 have a minimum of overlaps, when assembled, to minimize heat leaks as illustrated in FIG. 14. It is also possible to include impermeable membranes 120 between or attached to individual insulation layers 104 to improve insulation performance. Some insulation is only available in a loose form. In this case the insulation will be contained in sealed bags 121 to contain the material into shaped flexible pillows. These pillows can be arranged in any manner of ways to form the required insulation layer for the vessel 100 as illustrated in FIG. 15.

Figure 16:
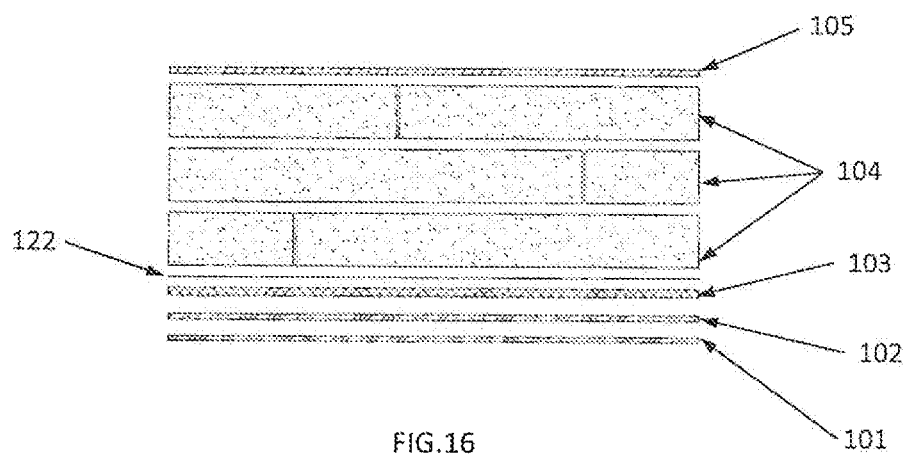

In some applications of the collapsible cryogenic fluid storage vessel 100 the need for increased safety or redundancy may be required. In this case a secondary membrane fluid containment layer 122 can be added to the layers of the tank 100 as shown in FIG. 16. Any leaks from the membrane fluid containment layer 101 will flow into the volume between it and the secondary membrane fluid containment layer 122 as these layers are sealed membranes. The space between the layers can be vented in a controlled manner and filtered to regulate the pressure in the space and what escapes to the local atmosphere.

Although the foregoing subject matter has been described in detail for purposes of clarity of understanding, it will be apparent that certain changes and modifications may be practiced that are within the scope of the disclosed subject matter. Accordingly, the present embodiments are to be considered as illustrative and not restrictive, and the subject matter disclosed herein is not to be limited to the details given herein, but may be modified within the scope and equivalents of the disclosed subject matter.

We claim:

1. A pressure vessel capable of storing cryogenic fluids and associated gasses that is constructed from flexible materials that enable the pressure vessel to be folded for storage and transport, comprising:
   a membrane fluid containment layer;
   a textile based structural layer that supports fluid and gas pressure loads;
   a textile based protective liner;
   multiple insulation layers;
   a protective membrane outer cover; and,
   one or more fixtures adapted for and configured to enable filling and draining the pressure vessel with cryogenic fluid, wherein said pressure vessel is flexible and collapsible, wherein the textile based structural layer is constructed from one or more types of fibers that can withstand cryogenic temperatures and the fiber or fibers consist of at least one selected from the group consisting of Vectran, Kevlar, polyester, nylon and stainless steel.

2. The pressure vessel of claim 1, where the layers of the pressure vessel are periodically attached to one another to cause said attached layers to move in unison.

3. The pressure vessel of claim 1, wherein the protective membrane outer cover prevents ambient air exchange in the multiple insulation layers that could lead to condensation and reduced insulation performance.

4. The pressure vessel of claim 1, wherein the multiple insulation layers are constructed from one or more types of fibers that can withstand cryogenic temperatures.

5. The pressure vessel of claim 4, wherein the fibers or combinations of fibers are at least one selected from the group consisting of wool, glass fibers and aerogel.

6. The pressure vessel of claim 1, wherein the membrane fluid containment layer includes a self-healing layer that can seal any holes that form in the membrane.

7. A pressure vessel capable of storing cryogenic fluids and associated gasses that is constructed from flexible materials that enable the pressure vessel to be folded for storage and transport, comprising:
   a membrane fluid containment layer;
   a textile based structural layer that supports fluid and gas pressure loads;
   a textile based protective liner;
   multiple insulation layers;
   a protective membrane outer cover; and,
   one or more fixtures adapted for and configured to enable filling and draining the pressure vessel with cryogenic fluid, wherein said pressure vessel is flexible and collapsible, wherein the textile based structural layer is a woven webbing construction made from webbings that are woven to one another to form a structural shell or net that can withstand stresses that would be induced by hydrostatic or pressurization loads that would be caused by filling of the pressure vessel with cryogenic fluid, wherein the webbings are intermittently joined.

8. A pressure vessel capable of storing cryogenic fluids and associated gasses that is constructed from flexible materials that enable the pressure vessel to be folded for storage and transport, comprising:
   a membrane fluid containment layer;
   a textile based structural layer that supports fluid and gas pressure loads;
   a textile based protective liner;
   multiple insulation layers;
   a protective membrane outer cover; and,
   one or more fixtures adapted for and configured to enable filling and draining the pressure vessel with cryogenic fluid, wherein said pressure vessel is flexible and collapsible, wherein the textile based structural layer comprises an overlapped webbing construction made from webbings that are woven to one another to form a structural shell or net that can withstand stresses that would be induced by hydrostatic or pressurization loads that would be caused by filling of the pressure vessel with cryogenic fluid, wherein the webbings are intermittently joined.

9. A pressure vessel capable of storing cryogenic fluids and associated gasses that is constructed from flexible materials that enable the pressure vessel to be folded for storage and transport, comprising:
   a membrane fluid containment layer;
   a textile based structural layer that supports fluid and gas pressure loads;
   a textile based protective liner;
   multiple insulation layers;
   a protective membrane outer cover; and,
   one or more fixtures adapted for and configured to enable filling and draining the pressure vessel with cryogenic fluid, wherein said pressure vessel is flexible and collapsible, wherein individual ones of the multiple insulation layers have seams and individual ones of the multiple insulation layers are is layered such that the seams do not overlap.

10. A pressure vessel capable of storing cryogenic fluids and associated gasses that is constructed from flexible materials that enable the pressure vessel to be folded for storage and transport, comprising:
    a membrane fluid containment layer;
    a textile based structural layer that supports fluid and gas pressure loads;
    a textile based protective liner;
    multiple insulation layers;
    a protective membrane outer cover; and,
    one or more fixtures adapted for and configured to enable filling and draining the pressure vessel with cryogenic fluid, wherein said pressure vessel is flexible and collapsible, wherein the multiple insulation layers contain thin flexible impermeable membranes between some or all of individual ones of the multiple insulation layers.

11. A pressure vessel capable of storing cryogenic fluids and associated gasses that is constructed from flexible materials that enable the pressure vessel to be folded for storage and transport, comprising:
    a membrane fluid containment layer;
    a textile based structural layer that supports fluid and gas pressure loads;
    a textile based protective liner;
    multiple insulation layers;
    a protective membrane outer cover; and,
    one or more fixtures adapted for and configured to enable filling and draining the pressure vessel with cryogenic fluid, wherein said pressure vessel is flexible and collapsible, wherein the membrane fluid containment layer is reinforced with a textile.

12. A pressure vessel capable of storing cryogenic fluids and associated gasses that is constructed from flexible materials that enable the pressure vessel to be folded for storage and transport, comprising:
    a membrane fluid containment layer;
    a textile based structural layer that supports fluid and gas pressure loads;
    a textile based protective liner;

multiple insulation layers;
a protective membrane outer cover; and,
one or more fixtures adapted for and configured to enable filling and draining the pressure vessel with cryogenic fluid, wherein said pressure vessel is flexible and collapsible, wherein the membrane fluid containment layer is joined to at least one layer selected from the group consisting of a textile layer and a foam layer that limits a bend radius of the membrane fluid containment layer to prevent folding damage.

* * * * *